(12) United States Patent
Durand et al.

(10) Patent No.: US 8,369,524 B2
(45) Date of Patent: Feb. 5, 2013

(54) SIMPLIFIED METHOD FOR RENEWING SYMMETRICAL KEYS IN A DIGITAL NETWORK

(75) Inventors: Alain Durand, Rennes (FR); Jean-Pierre Andreaux, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1565 days.

(21) Appl. No.: 10/532,193

(22) PCT Filed: Oct. 30, 2003

(86) PCT No.: PCT/FR03/03250
§ 371 (c)(1),
(2), (4) Date: Apr. 21, 2005

(87) PCT Pub. No.: WO2004/043036
PCT Pub. Date: May 21, 2004

(65) Prior Publication Data
US 2006/0104440 A1      May 18, 2006

(30) Foreign Application Priority Data

Oct. 30, 2002  (FR) ...................................... 02 13982

(51) Int. Cl.
*H04L 29/06* (2006.01)
(52) U.S. Cl. ................... 380/260; 380/284; 713/171
(58) Field of Classification Search .................. 380/211, 380/277, 280; 713/170, 183, 193, 194; 726/10, 726/29
See application file for complete search history.

(56) References Cited

U.S. PATENT DOCUMENTS 5,159,634 A * 10/1992 Reeds, III ....................... 380/42
(Continued)

FOREIGN PATENT DOCUMENTS

| CA | 2381110 | 10/2002 |
| EP | 1253762 A1 * | 10/2002 |

OTHER PUBLICATIONS

Menezes et al. "Handbook of Applied Cryptography, Passage." Handbook of Applied Cryptography, CRC Press Series on Descrete Mathematics and its Applications, Boca Raton, FL, CRC Press, US, 1997, pp. 497-552.*

(Continued)

*Primary Examiner* — Nathan Flynn
*Assistant Examiner* — Michael R Vaughan
(74) *Attorney, Agent, or Firm* — Robert D. Shedd; Vincent E. Duffy; Joel M. Fogelson

(57) ABSTRACT

The invention concerns a method implemented in a communication network comprising a source device including: a first symmetrical key for encrypting data to be transmitted to a display device connected to the network; and the first symmetrical key encrypted with a second symmetrical network key known only to at least one display device connected to the network. When the source device needs to renew its first symmetrical key to encrypt new data, it generates a random number, then it calculates a new symmetrical key based on the first symmetrical key and on the random number. It then encrypts the data to be transmitted with the new symmetrical key and transmits to a display device, via the network: the data encrypted with the new symmetrical key, the random number, and the first encrypted symmetrical key with the second symmetrical network key.

4 Claims, 3 Drawing Sheets

U.S. PATENT DOCUMENTS

| | | | | |
|---|---|---|---|---|
| 5,224,166 | A * | 6/1993 | Hartman, Jr. | 713/190 |
| 5,475,826 | A * | 12/1995 | Fischer | 707/1 |
| 5,535,276 | A * | 7/1996 | Ganesan | 713/155 |
| 5,778,065 | A * | 7/1998 | Hauser et al. | 713/155 |
| 5,870,475 | A * | 2/1999 | Allan et al. | 380/282 |
| 6,041,123 | A * | 3/2000 | Colvin, Sr. | 713/153 |
| 6,178,244 | B1 * | 1/2001 | Takeda et al. | 380/277 |
| 6,266,415 | B1 * | 7/2001 | Campinos et al. | 380/247 |
| 6,539,092 | B1 * | 3/2003 | Kocher | 380/252 |
| 6,714,649 | B1 * | 3/2004 | Masuda et al. | 380/44 |
| 7,370,350 | B1 * | 5/2008 | Salowey | 726/7 |
| 2003/0053629 | A1 * | 3/2003 | Knapen | 380/277 |
| 2003/0108206 | A1 * | 6/2003 | Diehl et al. | 380/277 |
| 2005/0025091 | A1 * | 2/2005 | Patel et al. | 370/328 |

OTHER PUBLICATIONS

Menezes et al: "Handbook of Applied Cryptography, PASSAGE", Handbook of Applied Cryptography, CRC Press Series on Discrete Mathematices and Its Applications, Boca Raton, Florida, 1997, pp. 497-552.

Yu-Lun Huang et al: "Practical Key Distribution Schemes for Channel Protection", Computer Software and Applications Conference, 2000, COMPSAC 2000. The 24th Annual International Taipei, Taiwan Oct. 25-27, 2000, Los Alamitos, CA, USA, IEEE Comput. Soc. US, pp. 569-574.

"Encrypted Data Transmission With Dynamic Key Renewal", IBM Technical Disclosure Bulletin, vol. 35, No. 3, Aug. 1992, pp. 62-63.

Search Report Dated Mar. 26, 2004.

* cited by examiner

SIMPLIFIED METHOD FOR RENEWING SYMMETRICAL KEYS IN A DIGITAL NETWORK

This application claims the benefit, under 35 U.S.C. §365 of International Application PCT/FR03/03250, filed Oct. 30, 2003, which was published in accordance with PCT Article 21(2) on May 21, 2004 in French and which claims the benefit of French patent application No. 0213982, filed Oct. 30, 2002.

FIELD OF THE INVENTION

The present invention relates generally to the domain of managing cryptographic keys in local digital networks and more particularly in digital home networks.

BACKGROUND ART

Such a network is comprised of a set of devices interconnected by a digital bus, for example a bus according to the standard IEEE 1394. It particularly comprises two types of devices:
  Source devices capable of sending data over the network: These devices can recover the data through a "channel" external to the network.
  Presentation devices adapted to receive the data circulating on the network, to process it or present it to the user.

Hence, if the example of a digital home network designed to carry audio and/or video data to the various rooms of a house is used, the source devices are for example digital decoders receiving video programs from outside the network via a satellite antenna or via a cable connection, or even optical disc drives broadcasting data (audio and/or video) in digital form, on the network, read from a disc (in this case, the disc contains data coming from outside the network). The presentation devices are for example television receivers that can display video programs received from the network or, more generally, any type of device with the capability of decrypting encrypted data.

If one considers the viewpoint of the content providers that supply data coming from outside the local network, particularly from service providers broadcasting Pay TV programs or even optical disc editors for example, it is necessary to ensure that this transmitted data cannot be copied and can freely circulate (for example by being copied onto an optical disc or any other recording support) from one local network to another.

For this, it is known that data can be transmitted in secret form by encrypting it with cryptography algorithms using keys that are known beforehand by the devices authorised to receive this data or else that are exchanged according to specific secure protocols between the content provider and these devices.

The patent application PCT WO 00/62505 in the name of THOMSON multimedia, filed on Mar. 31, 2000 and claiming the priority of a French patent application in the name of the same applicant, filed on Apr. 13, 1999 and published under the reference FR 2792482, relates to a home network in which a public key specific to the network is used to encrypt the data circulating between the devices of the network, typically from the source devices mentioned above toward presentation devices. Only the presentation devices of this network have the private key corresponding to the public key. The pair (public key, private key) being specific to the network, data encrypted within the framework of this network cannot be decrypted by the devices of another network.

The use of a pair of asymmetric keys has some advantages, but also a few disadvantages. One of the main advantages is that no secret is memorized in the source devices: these devices know the public key but not the private key. However, the implementation of asymmetric keys is relatively slow with respect to that of symmetric keys. Moreover, the lifetime of asymmetric keys is short, demanding a regular revocation and the creation of new keys. In this case, data encrypted with a key, then recorded, can suddenly no longer be decrypted on the network. In addition, a large number of asymmetric keys are required.

The use of a symmetric key to encrypt the data would be considered as attractive. However, this would require the source devices to know this key, which would impose increased security constraints on them and consequently make them more expensive.

The present invention aims to solve the above-mentioned problems.

SUMMARY OF THE INVENTION

The subject of the invention is a method for renewing a symmetric key in a communication network comprising a device of a first type containing:
  a first symmetric key for encrypting the data to be transmitted to a device of a second type connected to the network; and
  said first symmetric key encrypted with a second symmetric network key known only by at least one device of a second type connected to said network.

According to the method, the device of a first type generates a random number, then computes a new symmetric key as a function of the first symmetric key and the random number. It then encrypts the data to transmit with the new symmetric key then it transmits to a device of a second type, via the network:
  the data encrypted with the new symmetric key;
  the random number; and
  the first symmetric key encrypted with the second symmetric network key.

The method can additionally comprise the steps that consist, for the device of a second type that receives the data transmitted by the device of a first type, of decrypting, with the second symmetric network key, the encryption of the first symmetric key; then to determine, according to the first symmetric key obtained in this manner and the random number received, the new symmetric key; and to decrypt the data received with the new symmetric key thus obtained.

BRIEF DESCRIPTION OF THE DRAWINGS

Other characteristics and advantages of the invention will emerge with the description of non-restrictive particular embodiments, explained using the figures herein, among which.

DETAILED DESCRIPTION OF THE EMBODIMENT OF THE INVENTION

An example of a communication network will be described initially to illustrate the manner in which the data and the different keys are exchanged. Subsequently, a more detailed description will be given of the specific management of the keys and their use for a secure transmission of data between a source device and a presentation device.

I] Description of the Network

Figure 1:
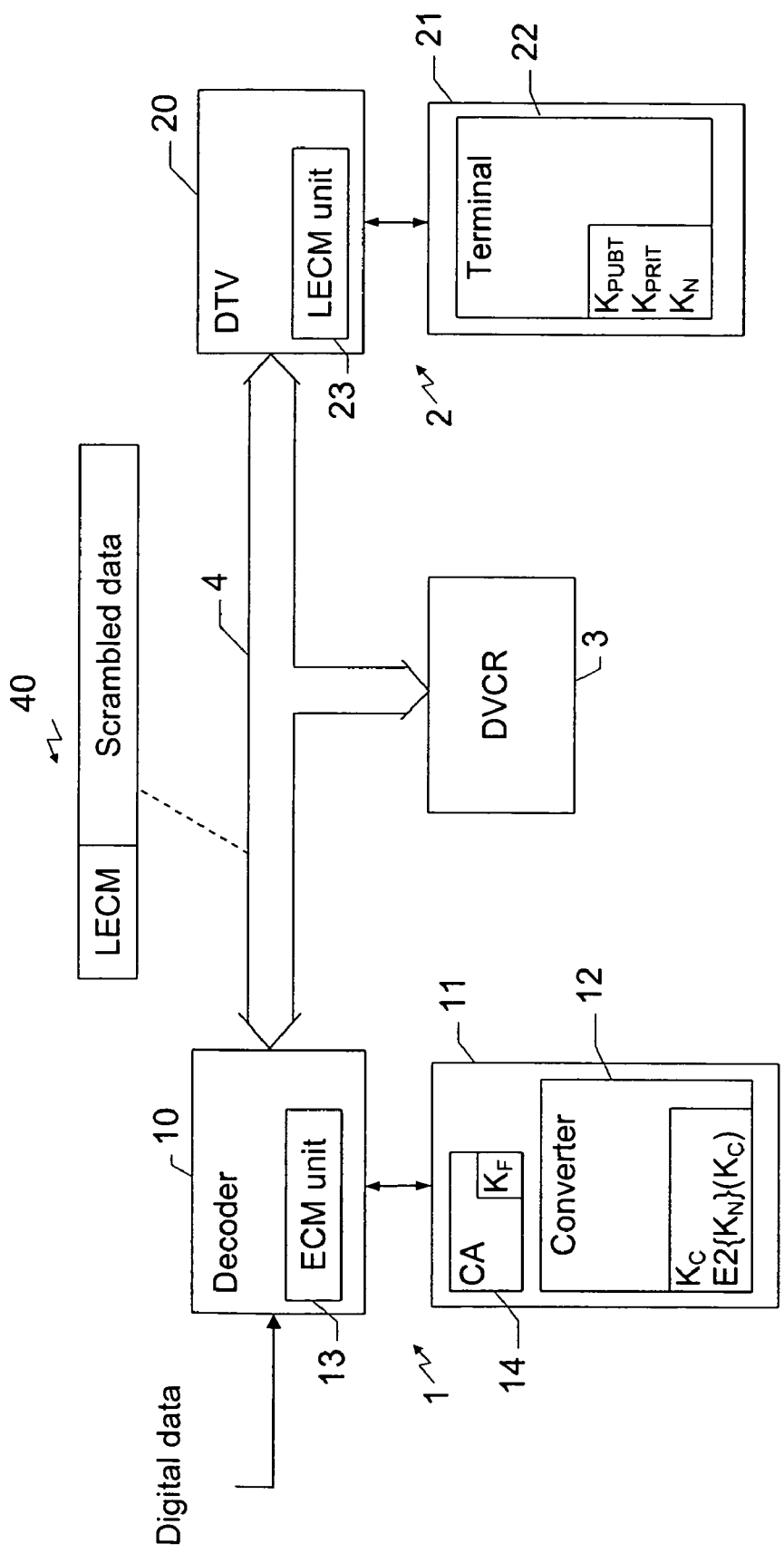
FIG. 1 is a block diagram of a communication network connecting several devices in which the invention is implemented.

FIG. 1 shows a digital home network comprising a source device 1, a presentation device 2 and a recording device 3 interconnected by a digital bus 4, which is for example a bus according to the standard IEEE 1394.

The source device 1 comprises a digital decoder 10 featuring a smart card reader fitted with a smart card 11. This decoder receives digital data, particularly audio/video programs broadcast by a service provider.

The presentation device 2 comprises a digital television receiver (DTV) 20 featuring a smart card reader fitted with a smart card 21 and the recording device 3 is particularly a digital video recorder (DVCR).

The digital data that enters the network via the source device 1 is generally data scrambled by a content provider, for example according to the principle of paying television. In this case, the data is scrambled using control words CW that are themselves transmitted in the data flow in encrypted form using an encryption key $K_F$ by being contained in ECM (Entitlement Control Message) control messages. The encryption key $K_F$ is made available to users that have paid to receive the data, particularly by being stored in a smart card. In the example of FIG. 1, the smart card 11 contains such a key $K_F$ together with a conditional access module CA 14 capable of decrypting the control words CW.

However, it should be noted that frequently, the authorization to receive the data is only temporary, as long as the user pays a subscription to the content provider. The key $K_F$ is therefore modified regularly by the content provider. Thanks to the method that will be described hereafter, the user will nevertheless be able to record the programs broadcast while he is a subscriber and can replay them as many times as he wishes on his own network, even when the key $K_F$ has been changed. However, as the data is recorded in scrambled form in the manner described, it can only be read on the network of the user that recorded them.

The source device 1 that receives this scrambled digital data formats it so that it can be broadcast on the digital network in a protection format specific to the domestic network. The decoder 10 comprises an "ECM unit" module 13 that extracts, from the flow of data received, the ECM messages containing the control words encrypted using the key $K_F$ to send them to the CA module 14. This module decrypts the control words CW and transmits them to a converter module 12 also contained in the smart card 11.

The converter module 12 contains a symmetric key $K_C$, for which the generation and transmission between the devices of the network will be described hereafter.

It should be noted that on FIG. 1, the network is shown in the state in which it is found when all the devices have been connected and have exchanged cryptographic keys according to the methods described hereafter. FIG. 1 particularly illustrates, for the source device 1 and presentation device 2, all the keys contained in each device. The keys shown are not necessarily present at every moment in the devices.

In particular, the presentation device 2 comprises in a memory a symmetric network key $K_N$. This key is distributed to every new presentation device recently connected to the network according to a secure protocol that is not the subject of the present invention and will not be described in further detail. Moreover, each presentation device has a pair of asymmetric keys ($K_{PUBT}$, $K_{PRIT}$), the first key being public and the second private. These keys are used within the framework of the authentication of network devices, as well as for the initial exchange of the symmetric keys as we will show subsequently.

The converter module 12 uses the symmetric key $K_C$ to encrypt the control words CW and it inserts these encrypted control words into messages called LECM (Local Entitlement Control Message). These LECM messages have the same function as the ECM messages included in the data flows received initially, namely transmit the control words in a protected form, but in the LECM messages, the control words CW are encrypted using the symmetric key $K_C$ instead of being encrypted using the key $K_F$ of the content provider.

Preferably, the key $K_C$ is frequently renewed, for example during the initiation of each transmission of data, with the purpose of preventing the source device from containing a long term secret, which would require increased protection.

Moreover, the converter module 12 inserts the symmetric key $K_C$ itself into the LECM messages, but encrypted using another symmetric key $K_N$ by an algorithm E2, that is $E2\{K_N\}(K_C)$.

In the rest of the description, the notation "$E\{K\}(M)$" will be used to mean the encryption of data M by an algorithm E with a key K.

The key $K_N$, which will be called network key hereafter, is not located in the source device 1, but in the presentation device 2. Following the creation of the key $K_C$, this latter is transmitted in a secure manner to the presentation device 2, which encrypts it using $K_N$ and retransmits the result to the source device that memorizes it in the converter module 12 of its card, for subsequent use.

The LECM messages thus constructed are then sent to the ECM unit 13, which inserts them into the flow of data instead of the ECM messages. It should be noted that when the content received is not already in scrambled form as described above and does not contain any ECM message, the converter module 12 is responsible in this case for putting the data in this form so that the data flow broadcast on the bus 4 is always in the form of data packets such as the packet 40 shown in FIG. 1 containing an LECM message and scrambled data.

The content of this packet can be summarized as follows:
LECM|E4{CW}(<data>); i.e.:
E2{$K_N$}($K_C$)|E3{$K_C$}(CW)|E4{CW}(<data>);
where "|" represents the concatenation operator.

The data therefore always circulates in scrambled form in the bus 4, and only the devices with access to the symmetric key $K_C$ can decrypt the control words CW and therefore decrypt the data. These devices are those having the network key $K_N$. This therefore prevents any copy made in the domestic network of FIG. 1 from being broadcast on other local networks.

When the digital television receiver 20 receives the data packets 40, they are transmitted to the "LECM unit" module 23, which extracts the LECM messages from them to be sent to a terminal module 22 contained in the smart card 21. This card first decrypts E2{$K_N$}($K_C$) using the key $K_N$ that it contains to obtain the key $K_C$. Next, using the key $K_C$, it decrypts E3{$K_C$}(CW) to obtain the control word CW that it transmits to the "LECM unit" module 23. It can then unscramble the data E4{CW}(<data>) using the control word. The unscrambled data is then presented to the user. For video data, this data can be viewed on the television receiver 20.

Thanks to the local digital network described above, the flow of data received from a content provider is converted by the source device which receives it in a data flow in which the data (or more specifically the control words CW) is encrypted with a symmetric key $K_C$. The key $K_C$ is transmitted with the data encrypted with its help, being itself encrypted using another symmetrical key, the network key $K_N$. The flow of data circulating in the local network thus contains data having a format specific to this local network that can only be decrypted by the presentation devices of the local network which all contain the network key $K_N$.

In addition, as the key $K_C$ is broadcast with the data (in encrypted form), it can be recorded, for example by the digital video recorder (DVCR) 4, at the same time as the data, which will provide subsequent access to the encrypted data.

Moreover, as the network key $K_N$ is not stored in the source devices, they do not contain any "long term" secret requiring increased security precautions.

However, the key $K_C$ must be renewed frequently and a more detailed description will now be given of how this key $K_C$ is generated and how its encryption using the network key $K_N$ is obtained according to different variants.

II] Generation and Management of the Symmetric Key $K_C$ During a First Connection to the Network of a Source Device Suppose that the source device 1 has just been connected to the domestic network illustrated in FIG. 1. Initially, it has no key in its converter module 12.

Figure 2:
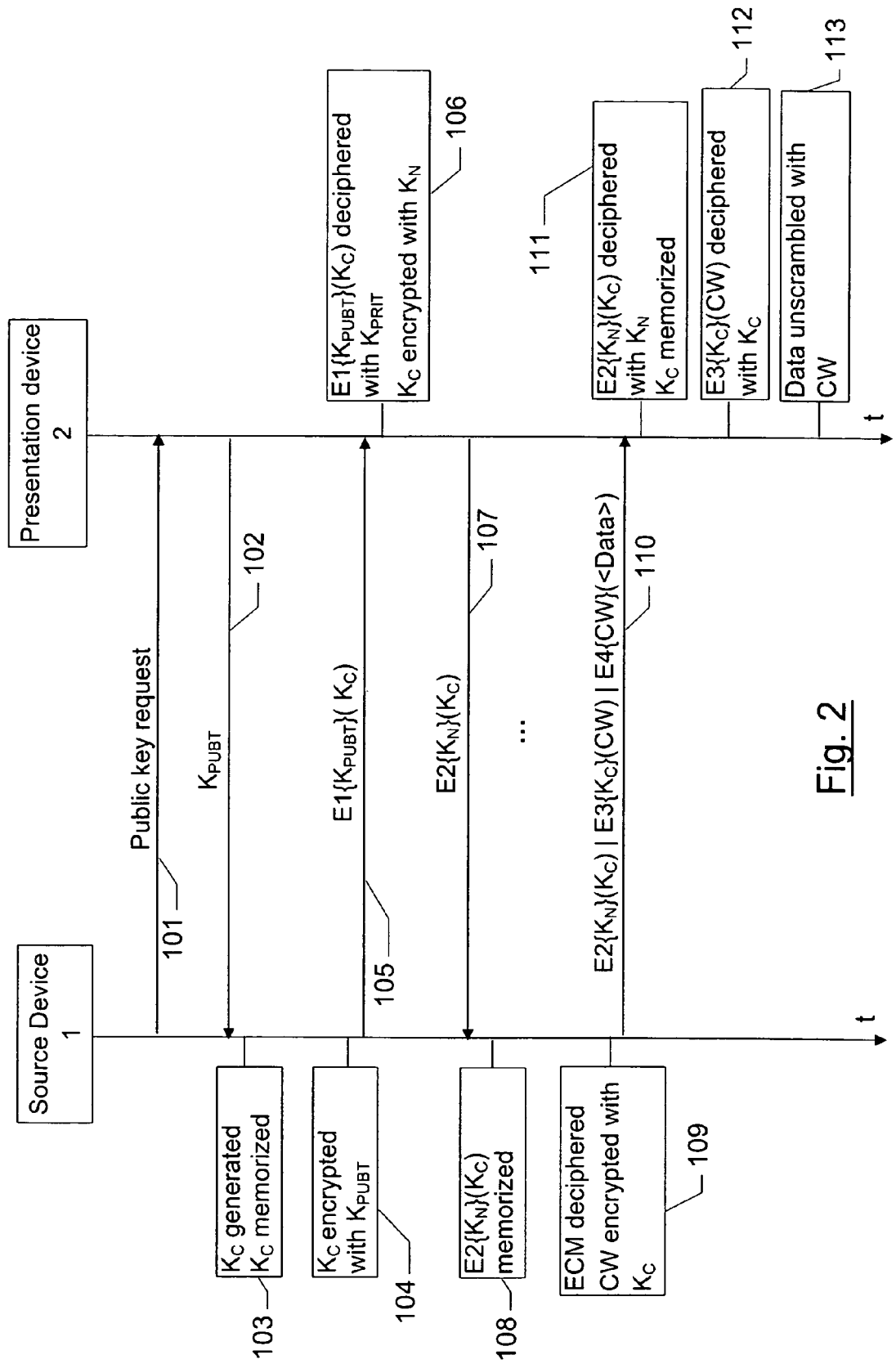
FIGS. 2 and 3 are timing diagrams illustrating the communications between an encrypted data source device and a presentation device of the said data in such a network according to an embodiment of the invention.

FIG. 2 shows the stages of an initial protocol enabling the source device to obtain a symmetric key $K_C$ encrypted using the network key $K_N$ held by a presentation device of the network.

When a first stage 101, the source device 1 launches a request on the network, requesting any presentation device to send its public key to it. In FIG. 1, a single presentation device is shown but naturally the digital home network can comprise several different presentation devices connected to the bus 4. All the presentation devices present and in the "activated" status on the network (namely, those whose power supply is not off or which are not in a standby mode with greatly reduced power supplied to the circuits of the device) are supposed to respond to the request of the source device by sending their public key.

Hereafter, it is assumed that the first key received by the source device 1 is the public key $K_{PUBT}$ sent during step 102 by the presentation device 2. The source device 1 acknowledges the first message received and will then exchange messages with the relevant presentation device.

The source device 1, and more precisely the converter module 12, then randomly generates a "short term" symmetric key $K_C$ and it memorises this key $K_C$ (step 103). For example, it uses a pseudo-random number generator for the generation of $K_C$.

The key $K_C$ is then encrypted at step 104 with the public key $K_{PUBT}$ by the intermediary of an asymmetric encryption algorithm E1, for example the algorithm "RSA OAEP" ("Rivest, Shamir, Adleman Optimal Asymmetric Encryption Padding"—described in "*PKCS#1: RSA Cryptography Specifications, version* 2.0 (October 1998)"), then transmitted in encrypted form $E1\{K_{PUBT}\}(K_C)$ to the presentation device 2 (step 105). This presentation device decrypts the key $K_C$ using its private key $K_{PRIT}$ then encrypts it again according to a symmetric encryption algorithm E2 using the symmetric network key $K_N$ (step 106) and sends back $K_C$ thus encrypted (i.e. $E2\{K_N\}(K_C)$) to the source device (step 107), which memorizes this information (step 108), preferably in its converter module 12.

At the end of this first series of steps 101 to 108, the source device 1 thus possesses a symmetric key $K_C$ in its converter module 12 that will be able to be used to encrypt data, typically the control words CW, and the encryption of this key $K_C$ using the network key $K_N$. It is then ready to broadcast data over the network. It should be noted that the source device does not know the secret network key $K_N$.

The subsequent steps 109 to 113 shown in FIG. 2 relate to the transmission of "useful" data, i.e. typically scrambled audio video data.

The data received by the source device 1 comprises ECM messages. The source device decrypts these messages to extract the control words CW from them then it encrypts the control words CW using the symmetric key $K_C$ by the intermediary of a symmetric encryption algorithm E3 (step 109). The source device 1 then reinserts these encrypted control words (i.e. $E3\{K_C\}(CW)$) into the data flow and transmits all the data over the bus 4 to the presentation device(s) on the network (step 110). During step 110, the source device also sends the key $K_C$ encrypted using $K_N$ that it previously memorized at step 108. In practice, the data $E2\{K_N\}(K_C)$ and $E3\{K_C\}(CW)$ are inserted into the LECM message that is sent with the scrambled "useful" data $E4\{CW\}(<Data>)$.

It should also be noted that the useful data transmitted at step 110 are encrypted according to a symmetric encryption algorithm E4 using control words CW.

The presentation device 2 that receives the data sent at step 110 first decrypts $E2\{K_N\}(K_C)$ using $K_N$ to obtain the key $K_C$ which is memorized (step 111) and, using $K_C$, it can decrypt $E3\{K_C\}(CW)$ to access the control words CW (step 112) and thus descramble the useful data (step 113).

The symmetric encryption algorithms E2, E3 and E4 can be identical or different. For example, it is possible to use the "AES" algorithm (Advanced Encryption Standard—also called "Rijndael"—and described by J. Daemen and V. Rijmen in "*Proceedings from the First Advanced Encryption Standard Candidate Conference, National Institute of Standards and Technology* (*NIST*), August 1998"), or else the "TwoFish" algorithm (described in the article "*TwoFish—a Block Encryption Algorithm*" by B. Schneier, J. Kelsey, D. Whiting, D. Wagner, N. Ferguson and published in the same NIST conference report).

III] Renewal of the Symmetric Key $K_C$

When it is necessary to renew the key $K_C$, particularly before broadcasting new content on the network, one can consider using the same protocol as described in FIG. 2 (steps 101 to 108). Nevertheless, this protocol involves encryption computations using asymmetric algorithms that require a fairly large computing power and which are relatively long to implement in smart card processors. This is why a second protocol is used for the renewal of the "short term" symmetric key $K_C$.

Figure 3:
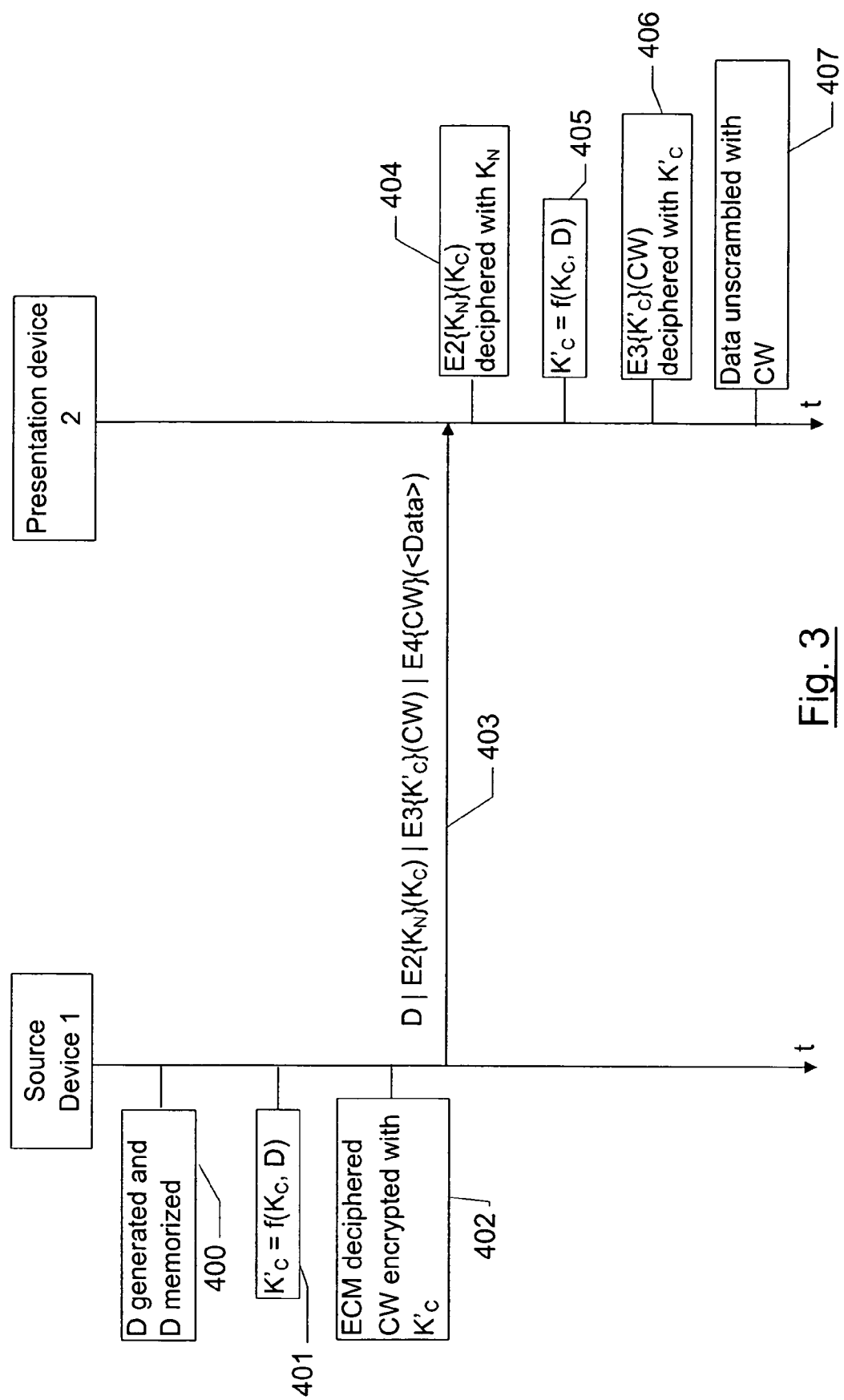

This second protocol enabling the renewal of the symmetric key K.sub.C is shown in FIG. 3.

According to this protocol, during a first step 400, the source device 1 (or more specifically its converter module 12) generates a random number D and memorizes it. It then computes (step 401) the new symmetric key $K'_C$ by applying a function f to the key $K_C$ memorized during the first protocol (at step 103) and to the number D. The function f is particularly a classic derivation function such as a hash function (for example, the function SHA-1 described in the document "*Secure Hash Standard, FIPS PUB* 180-1, *National Institute of Standard Technology,* 1995" can be used) or even an encryption function such as the function XOR. It is a "one way" function", namely, knowing the result $f(K_C, D)$ and the number D, it is impossible to find the key $K_C$.

Step 402 corresponds to step 109 of the protocol of FIG. 2 and consists of extracting ECM messages included in the data received by the source device to decrypt them in the module CA 14 and extract the control words CW from them in the converter module by using the new symmetric key $K'_C$. However, the broadcasting of "useful" data over the network by the source device is slightly different from the broadcasting carried out in step 110.

Indeed, in step 403, the source device inserts the data D generated in step 400 into the LECM message. It also inserts the following into this LECM message:

the initial symmetric key $K_C$ encrypted with the network key $K_N$ ($E2\{K_N\}(K_C)$) and one or more control words CW encrypted with the new symmetric key $K'_C$ ($E3\{K'_C\}(CW)$).

When the presentation 2 receives the data broadcast in step 403, it first decrypts $E2\{K_N\}(K_C)$ with the network key $K_N$ (step 404), then it computes the new symmetric key $K'_C$ from $K_C$ and from D by applying the function f (step 405). Having obtained $K'_C$, it can then decrypt $E3\{K'_C\}(CW)$ to obtain the control word CW (step 406) and unscramble the "useful" data using this control word (step 407).

Thanks to this protocol, it is unnecessary to exchange data between a source device and a receiver device to obtain the renewal of a symmetric key $K'_C$. This is particularly advantageous for example when no presentation device is in an "activated" status on the network and when a user wants to record a program (digital content) received by the source device. The source device can thus renew its symmetric encryption key $K_C$ without requiring any presentation device and can thus broadcast useful data accompanied by LECM messages protected by this key renewed so that the data is recorded in a digital storage device such as the video recorder 3 of FIG. 1.

The invention claimed is:

1. Method for transmitting encrypted data scrambled using a control word in a communication network comprising a device of a first type containing:

a first symmetric key for encrypting a control word sent to a device of a second type connected to the network, wherein said second type of device is a different device type from said device of the first type; and and an encrypted first symmetric key which is generated from the encryption of said first symmetric key with a second symmetric network key known only by the device of the second type connected to said network;

the method comprising the steps for the device of the first type of:

(a) generating a random number;

(b) computing a new symmetric key as a function of the first symmetric key and said random number;

(c) encrypting the control word used to scramble the data to be transmitted with the new symmetric key; and (d) after steps a, b, and, c; subsequently transmitting to the device of the second type, via said network:

the control word encrypted with the new symmetric key;

the data scrambled using the control word;

the random number; and said encrypted first symmetric key.

2. Method according to claim 1, wherein the function used to compute the new symmetric key is a one-way derivation function.

3. Method according to claim 2, wherein the function is a hash function.

4. Method according to claim 1, also comprising the steps for the device of the second type that receives the data transmitted at step (d) of:

(e) decrypting, with the second symmetric network key the encrypted first symmetric key as to produce the first symmetric key;

(f) determining, based on the first symmetric key obtained at step (e) and on said random number, the new symmetric key;

(g) decrypting the encrypted control word with the new symmetric key; and (h) descrambling the scrambled data with the decrypted control word.

* * * * *